United States Patent [19]

Phelps et al.

[11] Patent Number: 5,381,536
[45] Date of Patent: Jan. 10, 1995

[54] METHOD AND APPARATUS FOR SEPARATE MARK AND WAIT INSTRUCTIONS FOR PROCESSORS HAVING MULTIPLE MEMORY PORTS

[75] Inventors: Andrew E. Phelps; Roger E. Eckert, both of Eau Claire, Wis.; Richard E. Hessel, Pleasanton, Calif.

[73] Assignee: Cray Research, Inc., Eagan, Minn.

[21] Appl. No.: 249,084

[22] Filed: May 25, 1994

Related U.S. Application Data

[63] Continuation of Ser. No. 165,012, Dec. 10, 1993, abandoned, which is a continuation of Ser. No. 911,649, Jul. 10, 1992, abandoned, which is a continuation-in-part of Ser. No. 459,083, Dec. 29, 1989, Pat. No. 5,197,130.

[51] Int. Cl.$^6$ .................. G06F 12/00; G06F 13/00; G06F 15/16
[52] U.S. Cl. .................. 395/375; 364/262.9; 364/263; 364/946.7; 364/973
[58] Field of Search .................. 395/375, 800, 775

[56] References Cited

U.S. PATENT DOCUMENTS

| | | | |
|---|---|---|---|
| 4,320,451 | 3/1982 | Bachman | 395/650 |
| 4,615,001 | 9/1986 | Hudgins | 395/650 |
| 4,644,461 | 2/1987 | Jennings | 395/650 |
| 4,663,706 | 5/1987 | Allen | 395/200 |
| 4,779,194 | 10/1988 | Jennings | 395/650 |
| 4,789,925 | 12/1988 | Lahti | 364/200 |
| 4,805,107 | 2/1989 | Kieckhafer | 395/650 |
| 4,807,111 | 2/1989 | Cohen | 395/250 |
| 4,872,111 | 10/1989 | Daberkow | 364/200 |
| 4,891,753 | 1/1990 | Budde | 364/200 |
| 4,935,849 | 6/1990 | Miranker | 364/200 |
| 4,949,239 | 8/1990 | Gillett | 364/200 |
| 4,969,117 | 11/1990 | Miranker | 364/200 |
| 5,031,089 | 7/1991 | Liu | 395/725 |

Primary Examiner—David Y. Eng
Attorney, Agent, or Firm—Schwegman, Lundberg & Woessner

[57] ABSTRACT

The present invention provides a method and apparatus for handling memory hazards in processors having multiple memory ports wherein the operation of marking of the memory requests that may be related to a memory hazard is separated from the operation of waiting for the memory hazard to clear. The separation of the operation of marking of memory hazards from the operation of waiting for memory hazards to clear allows a compiler to schedule other instructions, as well as other memory operations not directed to the memory location involved in the memory hazard sequence, during the time between the operations of marking and waiting for the memory hazard to clear. The waiting period ends once it is clear that the marked memory requests will execute in the order in which they were issued.

8 Claims, 4 Drawing Sheets

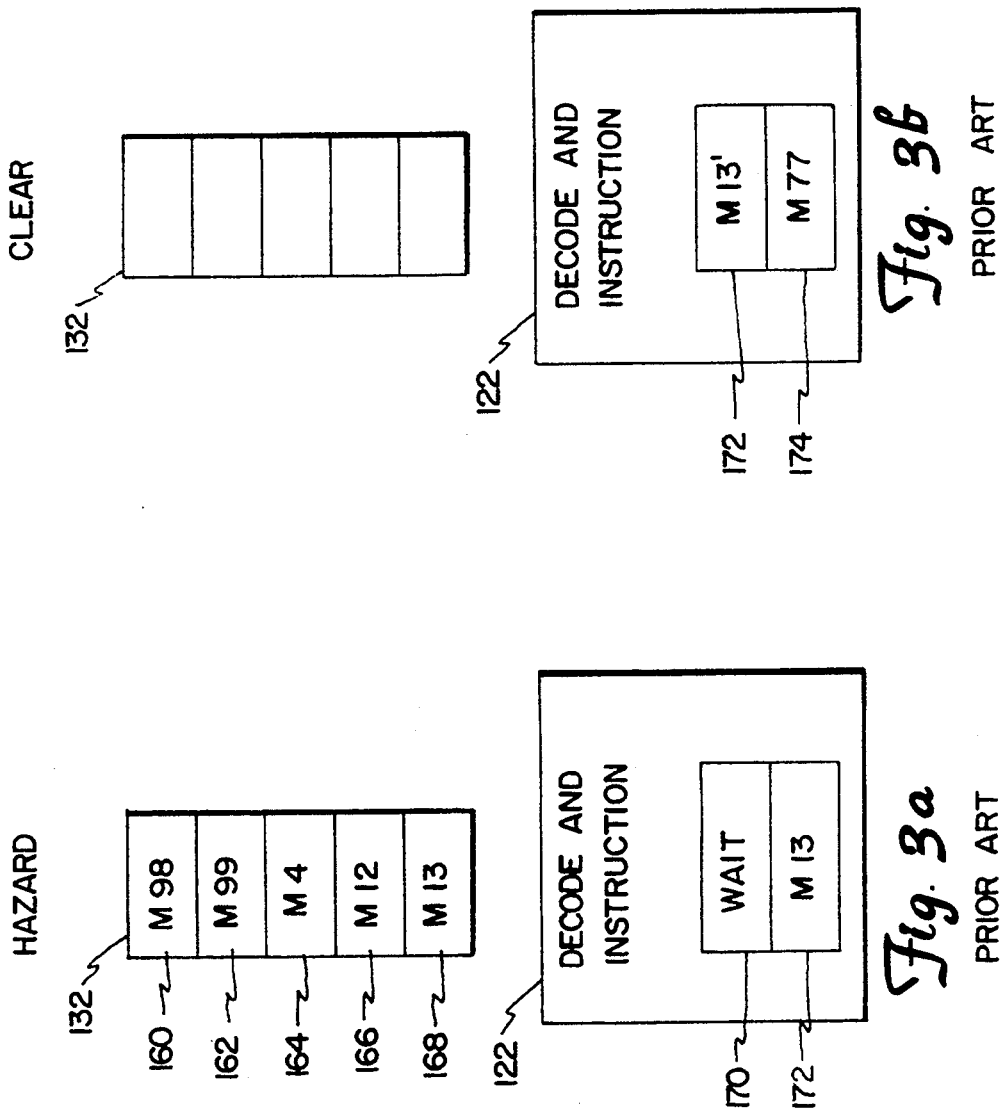

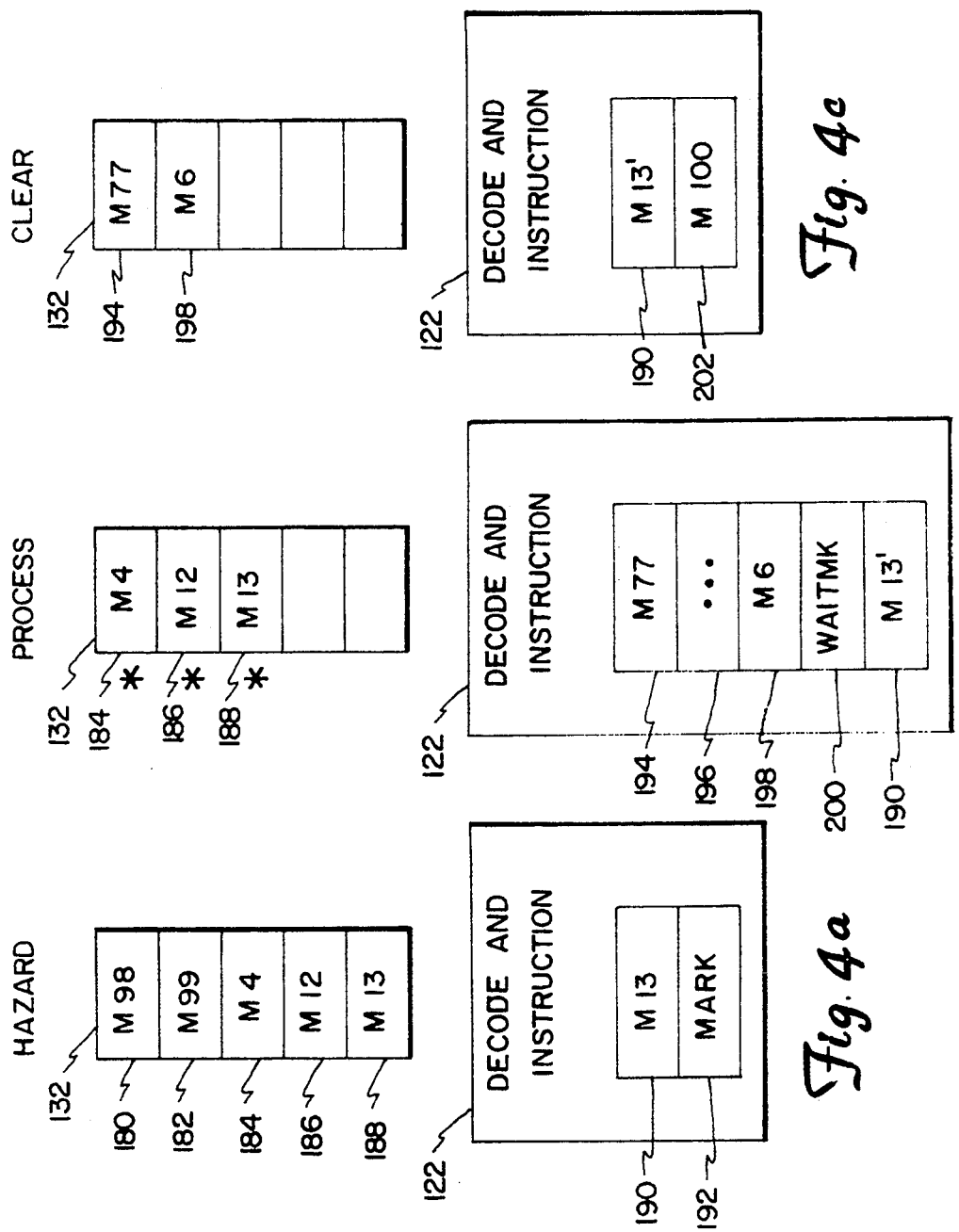

METHOD AND APPARATUS FOR SEPARATE MARK AND WAIT INSTRUCTIONS FOR PROCESSORS HAVING MULTIPLE MEMORY PORTS

RELATED APPLICATIONS

This application is a continuation of Ser. No. 08/165,012 filed Dec. 10, 1993 now abandoned which is a continuation of Ser. No. 07/921,649 filed Jul. 10, 1992 now abandoned which is continuation-in-part of an application filed in the United States Patent and Trademark Office on Dec. 2, 1989, entitled CLUSTER ARCHITECTURE FOR A HIGHLY PARALLEL SCALAR/VECTOR MULTIPROCESSOR SYSTEM, Ser. No. 07/459,083, now issued as U.S. Pat. No. 5,197,130 and assigned to the assignee of the present invention, a copy of which is attached hereto as an appendix and the disclosure of which is hereby incorporated in the present application. This application is also related to co-pending application filed in the United States Patent and Trademark Office entitled METHOD AND APPARATUS FOR NON-SEQUENTIAL RESOURCE ACCESS, now issued as U.S. Pat. No. 5,208,914, and assigned to the assignee of the present invention, and a copy of which is also attached hereto as an appendix and the disclosure of which is hereby incorporated in the present application.

TECHNICAL HELD

The present invention relates generally to memory management and memory access by processors in a computer processing system. More particularly, the present invention relates to a method and apparatus for avoiding memory hazards in processors having multiple memory ports by separating the operation of marking of the memory hazards from the operation of waiting for the marked memory hazards to clear.

BACKGROUND OF THE INVENTION

In many high performance computer processing systems there are multiple memory ports or access paths between a processor and main memory. The use of multiple memory ports or access paths to main memory allows for faster memory access and, hence, faster operation of the processor. Unfortunately, the existence of multiple paths to main memory also introduces two types of memory problems. One type of problem occurs when multiple processors or multiple ports of a single processor attempt to access the same memory location simultaneously. This type of problem is traditionally solved by suspending all memory requests by all ports affected by the conflicting memory access requests until the conflict is resolved.

The second type of problem, referred to as a memory hazard, is well known to those skilled in the art and has been described in Vector Data Logical Usage Conflict Detection, U.S. Pat. No. 4,789,925; Chaining and Hazard Apparatus and Method, U.S. Pat. No. 4,935,849; Chaining and Hazard Apparatus and Method, U.S. Pat. No. 4,969,117; and System for Implementing Multiple Lock Indicators on Synchronous Pended Bus in Multiprocessor Computer System, U.S. Pat. No. 4,949,239.

A memory hazard occurs when a memory reference may happen in an order different than that which the user intended. For example, if a program stores (i.e., writes) a value to a memory location and then loads (i.e., reads) from that same memory location, the correct value must be read. When there are multiple paths between a processor and main memory, memory operations can traverse different paths and may encounter different delays associated with their respective paths. Thus, it is possible that two memory operations issued from the same processor and addressed to the same memory location could arrive at that memory location in a different order than they were issued. If one or both of these memory operations modifies that memory location, then the program could produce erroneous results. The inability to guarantee that memory operations (i.e., store and load instructions) will access a single memory location in the intended order is referred to as a memory hazard. Depending upon the mix of memory operations, a write-after-write hazard, read-after-write hazard, or write-after-read hazard could result.

The problem of memory hazards is encountered when multiple memory operations address the same memory location and at least one of those memory operations is a store. In high performance computer systems with multiple processors accessing main memory over multiple ports in a non-sequential manner, some mechanism must be provided to avoid the memory hazards and insure memory coherency. For purposes of the present invention, memory coherency in a processor with multiple memory ports is achieved when memory operations produce the same results as if there were only one sequential path to main memory.

The prior art provides two general solutions for handling the problem of memory hazards. In the first solution, the processor suspends all memory operations in response to a compiler-detected memory hazard until the memory hazard has been resolved. A second solution uses additional hardware to detect and resolve the memory hazard. For example, one prior art technique teaches using some type of hardware "lock" for each memory location to indicate when that location is in use during a read-modify-write operation and thus ensuring that the read-modify-write operation occurs in the proper order. Another hardware solution uses a conflict resolution hardware network and the odd/even chaining of alternate memory banks within each section of main memory to ensure that memory requests are executed in the order in which they are issued.

Although the prior art techniques are capable of handling memory hazards in processors having multiple memory ports, these techniques rely either on hardware mechanisms to detect and to resolve memory conflicts and memory hazards, or on the suspension of all memory operations during the resolution of memory hazards. Consequently, it would be desirable to provide a method and apparatus for resolving memory hazards in processors having multiple memory ports which minimizes any impact on processor performance while waiting for such memory hazards to clear without requiring additional circuitry to detect the existence of memory hazards.

SUMMARY OF INVENTION

The present invention provides a method and apparatus for handling memory hazards in processors having multiple memory ports wherein the operation of marking of the memory requests that may be related to a memory hazard is separated from the operation of waiting for the memory hazard to clear. The separation of the operation of marking of memory hazards from the operation of waiting for memory hazards to clear allows a compiler to schedule other instructions, as well as other memory operations not directed to the memory location involved in the memory hazard sequence, during the time between the operations of marking and waiting for the memory hazard to clear. The waiting period ends once it is clear that the marked memory requests will execute in the order in which they were issued.

Accordingly, it is a primary objective of the present invention to provide a method and apparatus which will enhance computer processor performance during the resolution of memory hazards.

It is another objective of the present invention to provide a method and apparatus which minimizes the circuitry required to detect and resolve memory hazards.

These and other objectives of the present invention will become apparent with reference to the drawings, the detailed description of the preferred embodiment and the appended claims.

BRIEF DESCRIPTION OF THE DRAWINGS

FIGS. 3a and 3b are block diagrams depicting a prior art software method for handling a memory hazard.

FIGS. 4a-4c are block diagrams depicting the method of the mark and wait mechanism of the present invention.

DETAILED DESCRIPTION THE PREFERRED EMBODIMENT

Figure 1:
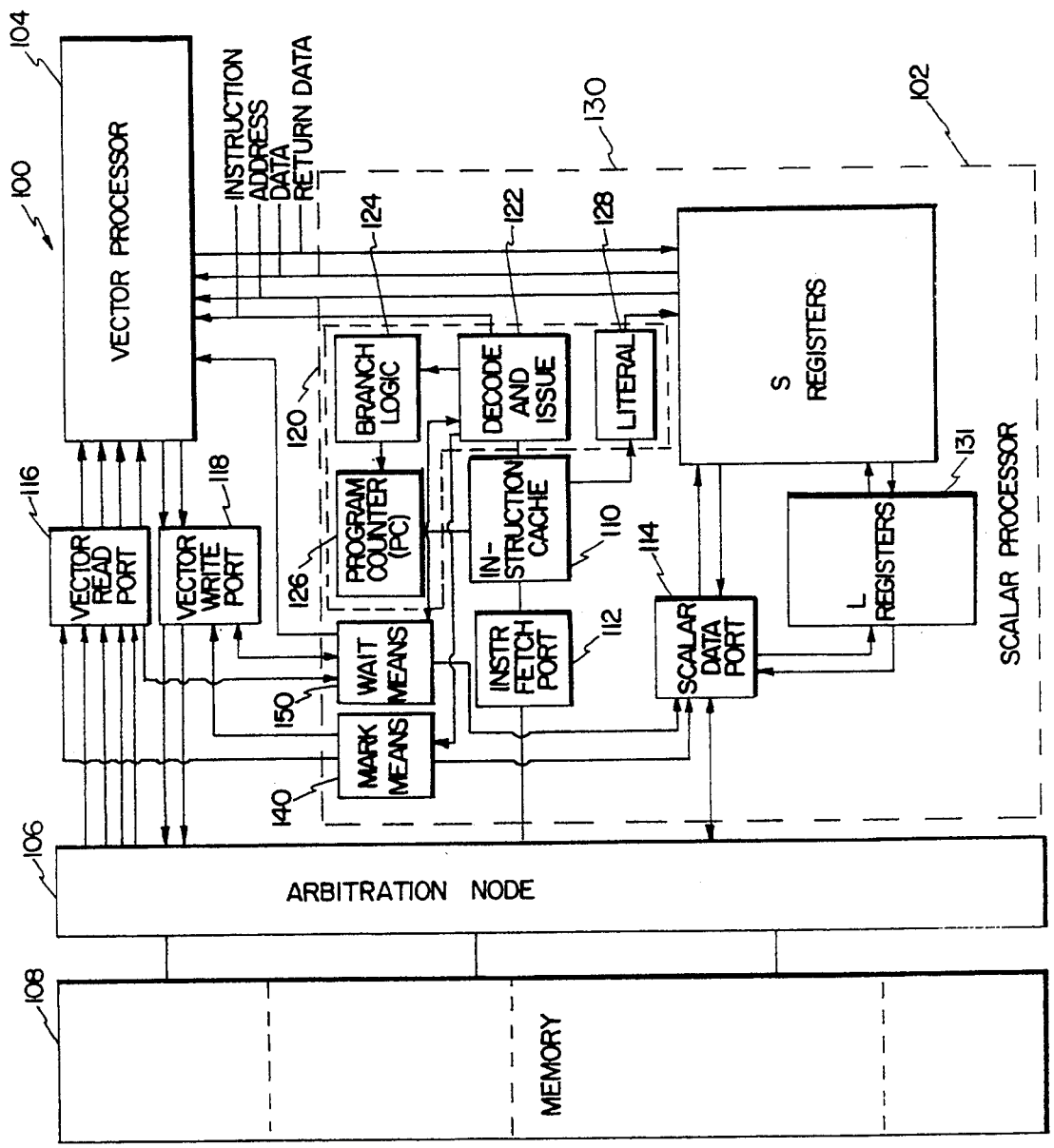
FIG. 1 is an overall block diagram of a processor having multiple memory ports with the mark and wait mechanism of the preferred embodiment of the present invention.

Referring now to FIG. 1, the preferred embodiment of the mark and wait mechanism of the present invention will be described. It will be understood that the detailed operation of the processor 100 having multiple memory ports 112, 114, 116 and 118 is not necessary for understanding the operation of the present invention, and that the present invention can be implemented on any type of processor having multiple memory ports. For a more detailed description of the processor of the preferred embodiment, reference is made to the previously-identified parent application entitled CLUSTER ARCHITECTURE FOR A HIGHLY PARALLEL SCALAR/VECTOR MULTIPROCESSOR, as well as the previously identified co-pending applications entitled SCALAR/VECTOR PROCESSOR and METHOD AND APPARATUS FOR NON-SEQUENTIAL RESOURCE ACCESS.

In the preferred embodiment, the processor 100 is logically and physically partitioned into a scalar processor 102 and a vector processor 104 and includes an arbitration node 106 and shared main memory 108. Both the scalar processor 102 and the vector processor 104 have their own register set and dedicated arithmetic resources. All registers and data paths in the processor 100 are 64-bits (one word) wide. For the scalar processor 102, there are 64 scalar S registers 130 and 512 local L registers 131. The L registers 131 serve as a software-managed register cache for the scalar processor 102. The vector processor 104 has 16 vector V registers (not shown). Each processor 100 also has up to 256 control C registers (not shown) that are physically distributed throughout the processor 100 and are used to gather and set control information associated with the operation of the processor. In the preferred embodiment, the scalar processor 102 also includes an instruction execution unit 120, an instruction cache 110, a mark mechanism 140 and a wait mechanism 150.

In the preferred embodiment, the instruction execution unit 120 in the scalar processor 102 includes decode and instruction circuit 122, branch logic circuit 124, a program counter (PC) register 126 and literal transfer circuit 128. The instruction execution unit 120 is pipelined with instruction fetch, decode and execution. The instruction pipeline is capable of sustaining an instruction issue rate of one instruction per cycle. All instructions are decoded directly without the support of microcode. Instruction issue and control is handled separately for scalar and vector instructions by the respective scalar processor 102 and vector processor 104.

Each instruction, vector or scalar, has a nominal starting point referred to as issue. All scalar and vector instructions must issue (i.e., begin execution) one instruction at a time. After the issue clock cycle, operands are read and operations are performed in a pipeline fashion using the various arithmetic functional units (not shown) of the respective scalar processor 102 or vector processor 104 if such functions are requested by the instruction. In the preferred embodiment, instructions may complete in any order.

The scalar processor 102 receives all control information in the form of instructions via an instruction cache 110. The instruction cache 110 is connected to the arbitration node 106 through an instruction fetch port 112. Data information is provided to both the scalar processor 102 and vector processor 104 through a series of data ports. A single bi-directional scalar data port 114 supports both reads and writes to the S and L registers 130, 131 in the scalar processor 102. Four vector read ports 116 and two vector write ports 118 support data transfers to the vector processor 104. In the preferred embodiment, each port 112, 114, 116, and 118 includes an associated port queue 132 for holding multiple memory requests until they are transferred out of the processor 100. Each of the port queues 132 is capable of storing up to 16 memory requests.

In the preferred embodiment, the ports 112, 114, 116 and 118 are all connected to the arbitration node 106 that provides a symmetrical multiplexor/switch network interface to each of eight memory sections 200 of the main memory 108. In this embodiment, the arbitration node 106 may also include a plurality of arbitration ports and arbitration port queues (not shown) as part of the multiplexor/switch. It will be understood that if the multiplexor/switch, such as the arbitration node 106, can guarantee that memory requests received by it will execute in the order in which they were issued by the decode and instruction circuit 122, then the mark and wait mechanism of the present invention does not need to be extended into the multiplexor/switch. Conversely, if the multiplexor/switch interface cannot guarantee that memory requests received by it will execute in the order in which they were issued, then the mark mechanism 140 and wait mechanism 150, described hereafter, will need to be extended into the arbitration port queues of the arbitration node 106, for example.

Figure 2:
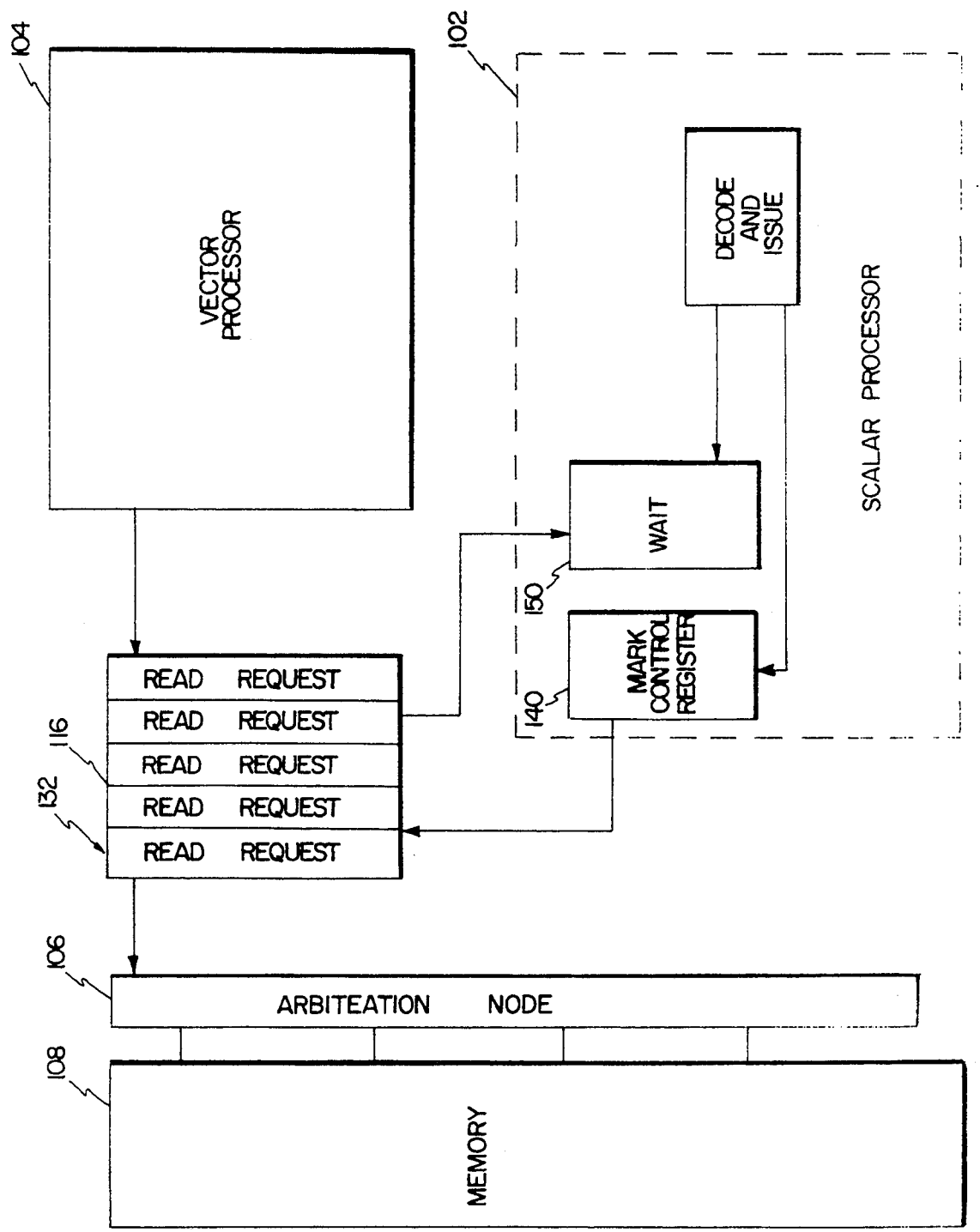
FIG. 2 is a detailed block diagram of the mark and wait mechanism for one of the memory ports of the processor shown in FIG. 1.

Referring to FIG. 2, in the preferred embodiment, the mark mechanism 140 is comprised of one or more control registers (not shown) that provide a bit indication corresponding to each port storage location as to whether the memory request stored in that port storage location is a "marked memory request". In the preferred embodiment, the bit indications in the control registers are further divided to represent whether the marked memory request is a store instruction or a load instruction. The mark mechanism 140 is connected to each of the data ports 114, 116 and 118 and to the decode and instruction circuit 122.

In the preferred embodiment, the wait mechanism 150 is also comprised of a control register (not shown) that indicates whether or not a wait state has been set. The wait mechanism 150 is connected to each of the data ports 114, 116 and 118 and to the decode and instruction circuit 122.

FIGS. 3a and 3b depict examples of how the compiler software and memory ports have handled memory hazards in the prior art. FIGS. 4a–4c show how the same memory hazard is handled by the present invention. Port queue 132 is depicted with up to five memory requests 160, 162, 164, 166, 168 stored in the port queue. Each memory request 160, 162, 164, 166, 168 is identified by a memory location. Instructions or memory requests processed by the decode and instruction circuit 122 are shown with the current instruction or memory request issuing 170 above the instructions or memory requests to follow 172. In the examples shown in FIGS. 3a, 3b and 4a–4c, each memory request is guaranteed to execute once it leaves the port queue 132.

In operation, as a compiler organizes the order of issue of instructions in a computer program, the compiler may detect memory hazards by comparing the memory locations referenced by each instruction. The process of detecting memory hazards as part of program compilation is well known in the art.

Referring to FIG. 3a, in the prior art example, the decode and instruction circuit 122 issues a wait instruction 170 upon detection of the memory hazard. Referring to FIG. 3b, the decode and instruction circuit 122 waits until all prior memory requests 160, 162, 164, 166, 168 have executed before issuing the memory request which initiated the memory hazard, instruction 172. No other memory requests, such as instruction 174, are made until the prior memory requests 160, 162, 164, 166, 168 have cleared the port queue 132.

In accordance with the mark and wait mechanism of the present invention, upon detection of a memory hazard, the compiler will insert a mark instruction and then insert a wait instruction (waitmk) into the instruction pipeline. Mark instructions may be either a markll instruction to mark load instructions, or a markls to mark store instructions.

For example, referring to FIG. 4a, a mark instruction 192 is inserted upon detection of the memory hazard created by memory requests 188, 190. When the decode and instruction circuit 122 encounters a mark instruction 192, a signal is sent to the mark mechanism 140 to mark any memory requests which may be stored in the pipeline such as, for example, memory requests 180, 182, 184, 186, 188 stored in the port queue 132.

Referring to FIG. 4b, after the specified memory requests are marked, other unmarked memory requests 194, 198 and non-memory related instructions 196 may be issued prior to the waitmk instruction 200. When the decode and instruction circuit 122 encounters the waitmk instruction 200, the wait mechanism 150 is set to indicate a wait state. While a wait state is set, the decode and instruction circuit 122 does not allow any memory request 190 related to the memory hazard to issue until all the marked memory requests 184, 186, 188 which come before the markls or markll instruction are guaranteed of executing in the order in which they were issued. Referring to FIG. 4c, once all marked instructions have cleared the port queue 132, the wait state is cleared and the memory request 190 related to the memory hazard is issued. The separation of the mark instruction and the wait instruction maximizes the performance of the processor 100 by allowing instructions which do not relate to a marked memory request to issue prior to the issuance of a waitmk instruction.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

We claim:

1. In a computer system including one or more computer processors and a common memory means for storing instructions and data, each of said computer processors including an instruction decode means for receiving, decoding and executing said instructions and a plurality of memory ports, each of said memory ports including pipeline means for storing a plurality of memory requests each of said memory ports accessing said memory means in response to the execution of any one of said instructions, a selection apparatus for queuing said memory requests whereby said memory requests execute in the order issued by said instruction decode means said instructions including one or more mark instruction and one or more wait instruction separate from said mark instruction inserted by a compiler in a sequence of instructions upon identification of a memory hazard by said compiler in said sequence of instructions said selection apparatus comprising:

mark means for identifying all memory requests which are stored in said pipeline means as marked memory requests in response to the execution of said mark instruction when issued by said instruction decode means;

means for generating said mark instruction in response to detection of said memory hazard;

wait means for preventing in response to said wait instruction being issued by said instruction decode means the execution of any additional memory requests until all of said marked memory requests are queued by said selection apparatus whereby said marked memory requests are guaranteed to execute in the order issued by said instruction decode means;

means for generating said wait instruction after said mark instruction has been generated in response to detection of said memory hazard.

2. The improvement of claim 1 wherein said memory means is organized into a plurality of sections, each memory section consisting of a plurality of individually addressable memory elements and wherein said memory ports can switchably access any of said memory sections.

3. The improvement of claim 1 wherein said mark means including a mark control register for storing the status of said pipelined memory requests as marked or unmarked.

4. The improvement of claim 3 wherein said mark control register includes:

bit means for indicating that a marked memory request is pending execution in response to a store instruction issued by said instruction decode section; and bit means for indicating that a marked memory request is pending execution in response to a load instruction issued by said instruction decode means.

5. The improvement of claim 1 wherein said wait means includes:

means for setting a wait state in all of said memory ports whereby execution of further memory requests which may conflict with said marked memory requests from said memory ports is prohibited;

canceling means for removing said wait state in all of said memory ports whereby execution of said further memory requests is enabled.

6. In a computer system including one or more computer processors for issuing instructions of a computer program and a common memory for storing instructions and data of said computer program, each of said computer processors including an instruction decode mechanism for receiving, decoding and executing said instructions and a plurality of memory ports, each of said memory ports including pipeline queues for storing a plurality of memory requests to said memory in response to the execution of any one of said instructions, a selection apparatus for queuing said memory requests whereby said memory requests execute in the order issued by said instruction decode means, said instructions including one or more mark instruction and one or more wait instruction separate from said mark instruction inserted by a compiler in a sequence of instructions upon identification of a memory hazard by said compiler in said sequence of instructions, a method for ensuring execution of said memory requests in the order issued by said instruction decode mechanism, the method comprising the steps of:

(a) during the compilation of a computer program to product said instructions performing the computer-implemented steps of:

(a1) detecting when any memory requests may not execute in the order in which said memory requests were issued due to a potential memory hazard;

(a2) inserting one of said mark instructions in said instruction sequence prior to a first memory request that caused the potential memory hazard;

(a3) scheduling unmarked instructions not affected by the potential memory hazard; and (a4) inserting one of said waitmk instructions prior to a second memory request that caused the potential memory hazard; and;

(b) during the execution of said computer program by said one or more computer processors:

(b1) marking one or more memory requests stored in said pipeline queues as marked memory requests in response to the execution of said mark instruction;

(b2) executing the unmarked instructions, including memory requests which do not conflict with said marked memory requests;

(b3) prohibiting the execution of said marked memory requests in response to the execution of said waitmk instruction until said selection apparatus has guaranteed that all marked memory requests which were marked will execute in the order in which they were issued by said instruction decode mechanism; and (b4) executing said marked memory requests.

7. The method of claim 6, said issued instructions including store and load operations, said marking step (b1) including a further marking of said memory requests which are to be executed in response to said store operations.

8. The method of claim 6, said issued instructions including store and load operations, said marking step (b1) including a further marking of said memory requests which are to be executed in response to said load operations.

* * * * *